United States Patent [19]

Dellacoletta

[11] Patent Number: 5,262,516
[45] Date of Patent: Nov. 16, 1993

[54] METHOD FOR PREPARING POLYETHERIMIDE-POLYAMIDE COPOLYMERS

[75] Inventor: Brent A. Dellacoletta, Evansville, Ind.

[73] Assignee: General Electric Company, Pittsfield, Mass.

[21] Appl. No.: 797,891

[22] Filed: Nov. 26, 1991

[51] Int. Cl.⁵ .................. C08G 73/10; C08G 69/26; C08G 8/02
[52] U.S. Cl. .................... 528/353; 528/125; 528/126; 528/128; 528/172; 528/173; 528/179; 528/180; 528/181; 528/182; 528/183; 528/185; 528/188; 528/207; 528/208; 528/351; 528/352
[58] Field of Search .............. 528/128, 172, 155, 351, 528/353, 358, 179, 180, 181, 183, 182, 188, 207-208, 125, 126, 173

[56] References Cited

U.S. PATENT DOCUMENTS

| | | | |
|---|---|---|---|
| 3,879,428 | 4/1975 | Heath | 549/241 |
| 3,972,902 | 8/1976 | Heath | 528/97 |
| 3,983,093 | 9/1976 | Williams, III | 528/128 |
| 4,058,505 | 11/1977 | D'Alelio | 528/128 |
| 4,108,836 | 8/1978 | Bilow | 528/128 |
| 4,374,972 | 2/1983 | Bolon | 528/185 |
| 4,417,044 | 11/1983 | Parekh | 528/185 |
| 4,540,748 | 9/1985 | Matzner et al. | 528/185 |
| 4,550,156 | 10/1985 | Gallagher | 528/185 |
| 4,565,858 | 1/1986 | Klopfer | 528/185 |
| 4,612,361 | 9/1986 | Peters | 528/185 |
| 4,689,391 | 8/1987 | Peters et al. | 528/179 |
| 4,794,157 | 12/1988 | Berdahl | 528/180 |
| 4,874,835 | 10/1989 | Berdahl | 528/179 |
| 4,965,337 | 10/1990 | Peters | 528/185 |

*Primary Examiner*—John Kight, III
*Assistant Examiner*—P. Hampton-Hightower

[57] ABSTRACT

A process for preparing a polyetherimide-polyimide copolymer by (a) reacting a bis (ether anhydride) with a stoichiometric excess of an organic diamine in an inert, non-polar solvent to form an amine-terminated oligomer-solvent mixture; (b) removing unreacted organic diamine from the oligomer-solvent mixture; and (c) reacting the oligomer with an aromatic dianhydride.

20 Claims, No Drawings

METHOD FOR PREPARING POLYETHERIMIDE-POLYAMIDE COPOLYMERS

BACKGROUND OF THE INVENTION

The present invention relates to a novel method for preparing improved polyetherimide-polyimide copolymers. The novel method results in polyetherimide-polyimide copolymers that have superior properties, including high glass transition temperatures, a completely transparent appearance with no insolubles present and no visible phase separation. The copolymers prepared by this method are flexible and can be extruded using conventional extrusion methods and apparatus without the hazard of the loss of volatile, and potentially toxic organic diamines.

Polyetherimides are well-known, high performance engineering thermoplastics that are typically prepared by reacting a bis(ether anhydride) with an organic diamine. Polyetherimide-polyimide copolymers, in which a portion of the bis(ether anhydride) is replaced by a more rigid dianhydride, such as pyromellitic anhydride, have been described in the literature. In general, these copolymers have higher glass transition temperatures (Tg) and heat distortion temperatures (HDT) than the corresponding polyetherimides, while maintaining their physical properties.

There are various methods currently employed in the preparation of polyetherimides. U.S. Pat. No. 4,417,044, discloses a method for preparing polyetherimides from an aromatic bis(ether anhydride) with an organic diamine in an inert solvent.

U.S. Pat. Nos. 3,983,093, and 4,565,858, disclose polyetherimides prepared from bisphenol dianhydride, organic diamines and pyromellitic dianhydride. The methods described in these patents involve reacting a mixture of a bis(ether anhydride) and another anhydride, such as pyromellitic anhydride, with an organic diamine. Other methods for preparing polyetherimides can be found in U.S. Pat. Nos. 4,794,157, 4,965,337, and 4,612,361.

Efforts to enhance the physical properties of a polyetherimide-polyimide copolymer prepared from a bis(ether anhydride) and an organic diamine by substituting pyromellitic dianhydride for 10 mole % or more of the bis(ether anhydride) have met with significant difficulties. The resulting copolymer often has poor surface appearance (pitting), is opaque with discrete phase separation, is very brittle, and generally is unsuitable for most commercial purposes, i.e., films, molding compounds, and coatings. It is believed that these characteristics are the result of the formation of polyimide blocks that are not soluble in the copolymer matrix.

Accordingly, a need exists for a process for preparing polyetherimide-polyimide copolymers having improved glass transition temperatures, improved physical appearance, homogeniety in composition, flexibility, and without the emission of potentially toxic organic amines during production.

SUMMARY OF THE INVENTION

In accordance with the present invention, a new method of preparing a polyetherimide-polyimide copolymer has been discovered. The new method results in an improved polyetherimide copolymer by incorporating one or more of an aromatic dianhydride, such as pyromellitic dianhydride, benzophenone dianhydride, sulfur dianhydride or the like, into a pre-polymer oligomer thus producing a polymer having an increased glass transition temperature, a transparent appearance with no visible phase separation and a flexible nature. The process comprises: a) reacting a bis (ether anhydride) with an organic diamine in an inert, non-polar solvent to form an oligomer-solvent mixture; b) removing unreacted organic diamine from the oligomer-solvent mixture; and c) reacting an aromatic dianhydride, with the oligomer in an inert, non-polar solvent.

DETAILED DESCRIPTION OF THE INVENTION

The novel process of the present invention unexpectedly results in the formation of a polyetherimide-polyimide copolymer having improved physical properties such as a high glass transition temperature (Tg) (often in excess of 216° C.), a transparent appearance due to an absence of insolubles (e.g., insoluble polyimide blocks) in the resulting polyetherimide, a homogeneous compositon, i.e., no observable phase separation, and a flexible nature. This novel process also eliminates the hazardous release of volatile, and potentially toxic vapors of the organic diamines employed in the synthesis of the polyetherimides during extrusion processes.

The first step of the process of the this invention involves reacting an aromatic bis(ether anhydride) of the formula:

I.

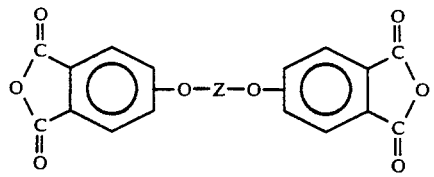

with at least one organic diamine having the formula

    II.

in an inert, non-polar solvent under polyetherimide-forming conditions, wherein Z is a divalent organic group of the formula:

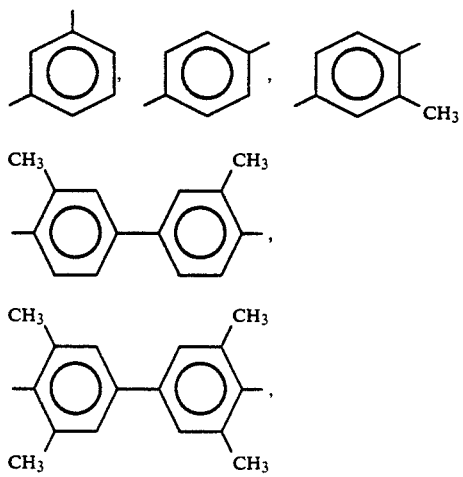

-continued

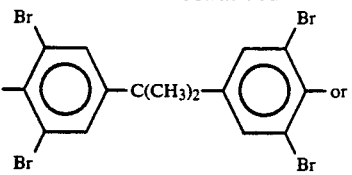

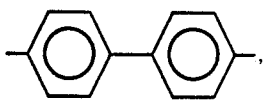

and divalent organic groups of the formula:

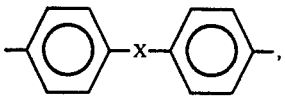

where x is:

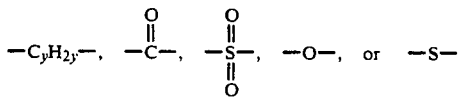

where y is an integer of from about 1 to about 5; R is a divalent aromatic hydrocarbon having from 6 to about 20 carbon atoms and halogenated derivatives thereof, an alkylene group having from 2 to about 20 carbon atoms, a cycloalkylene group having from 3 to about 20 carbon atoms, a $C_2$ to about $C_8$ alkylene terminated polydiorganosiloxane, or divalent group of the general formula:

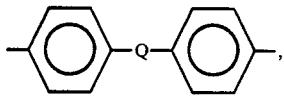

where Q is:

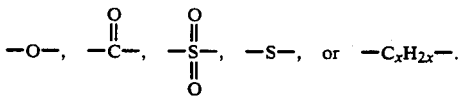

and x is an integer from 1 to about 5.

Bis(ether anhydride)s of formula I include, for example,
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride; and
1,4-bis(3,4-dicarboxyphenoxy)benzene dianhydride.

A preferred class of aromatic bis(ether anhydride)s covered by formula I includes compounds of formulas III, IV, and V, which follow:

III.

-continued

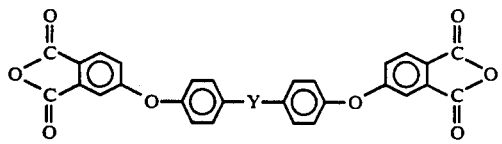

IV.

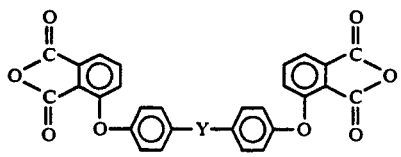

V.

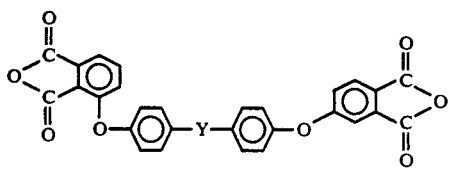

and mixtures thereof, where Y comprises O, S,

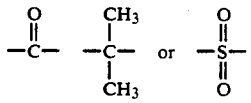

Aromatic bis(ether anhydride)s of formula III include for example:
2,2-bis(4-(3,4-dicarboxyphenoxy)phenyl)propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride; and mixtures thereof.

Aromatic bis(ether anhydride)s of formula IV include, for example:
2,2-bis(4-(2,3-dicarboxyphenoxy)phenyl)propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenyl sulfone dianhydride; and mixtures thereof.

The aromatic bis(ether anhydride) of formula V can be for example, 4-(2,3-dicarboxyphenoxy)-4'-(3,4-dicarboxyphenoxy)diphenyl-2,2-propane dianhydride.

Some of the aromatic bis(ether anhydride)s of formula I are shown in U.S. Pat. No. 3,972,902 (Darrell, Heath and Joseph Wirth). As described therein, the bis(ether anhydride)s can be prepared by hydrolysis, followed by the dehydration of the reaction product of a nitrosubstituted phenyl dinitrile with a metal salt of a dihydric phenol compound in the presence of a dipolar, aprotic solvent.

Additional aromatic bis(ether anhydride)s also included in formula (I) are shown by Koton, M. M., Florinski, F. S.; Besonov, M. I.; Rudakov, A. P. (Institute of Heteroorganic Compounds, Academy of Sciences, U.S.S.R.). U.S.S.R. 257,010, Nov. 11, 1969, Appl May 3, 1967, and by M. M. Koton, F. S. Florinski, *Zh. Org. Khin.*, 4 (5), 774 (1968).

The organic diamines of formula (II) include, for example:
m-phenylenediamine, p-phenylenediamine, 4,4'-diaminodiphenylpropane, 4,4'-diaminodiphenylmethane (commonly named 4,4'-methylenedianiline), 1,5-diaminophenyl sulfide, 4,4'- diaminodiphenyl sulfone,
4,4'-diaminophenyl ether (commonly named 4,4'-oxydianiline),
1,5-diaminonaphthalene,
3,3'-dimethylbenzidine,
3,3'-dimethoxybenzidine,
2,4-bis(β-amino-t-butylphenyl)ether, bis(p-β-methyl-o-aminopentyl)benzene, 1,3-diamino-4-isopropylbenzene,
1,2-bis(3-aminopropoxy)ethane,
benzidine,
m-xylylenediamine,
p-xylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, and mixtures thereof.

The polyetherimide-forming conditions employed in the first step generally include a reaction temperature of about 100° C. to about 200° C., preferably from about 160° C. to about 180° C. The solvent employed is an inert, non-polar, organic solvent that does not deleteriously affect the reaction. Relatively high-boiling, nonpolar solvents are preferred, and examples of such solvents are anisole, veratrole, biphenyl, terphenyl, diphenylether, diphenyl sulfide, chlorinated biphenyl, chlorinated diphenylethers, tetrachloroethylene, methylcyclohexane and the like. Preferred solvents include dichlorobenzenes, trichlorobenzenes, anisole, veratrole and the like. A particularly preferred solvent is o-dichlorobenzene. Mixtures of such solvents also can be employed.

It is preferred to effect the reaction of the dianhydride and the organic diamine in an inert atmosphere, such as nitrogen or helium. Sufficient solvent is generally utilized to provide a solids content in the range between about 1% and 90%, but preferably in the range between about 15% and about 70% w/v.

The goal of the first step of the process of this invention is to produce an amine-terminated polyetherimide oligomer that can subsequently be reacted with a dianhydride. Accordingly, the organic diamine is employed in a stoichiometric excess relative to the bis(ether anhydride). In general, from about 1.1 to about 5 moles of organic diamine per mole of bis (ether anhydride) are employed. Preferably, from about 1.3 to about 3 moles of organic diamine per mole of bis(ether anhydride) are used.

Reaction time for the first process step can vary from about 0.5 to about 20 hours depending upon such factors as the temperature employed, degree of agitation, nature of the reactants, solvent, and the like. During the course of the reaction, water of reaction is removed by distillation. The amount of water generated, as a percentage of theoretical, can be used to monitor the course of the reaction. When the amount of evolved water is substantially stoichiometric with respect to dianhydride (i.e. about 2 moles of water per mole of dianhydride), the reaction is substantially complete.

The first process step produces an oligomer-solvent mixture. As used herein, the term oligomer means a low molecular weight, amine-terminated polyetherimide. All of the bis (ether anhydride), i.e., more than 95%, preferably more than 99%, has reacted with organic diamine. Since a stoichiometric excess of organic diamine is used to prepare the oligomer, a significant amount of unreacted organic diamine usually remains in the solution. It has been discovered that this unreacted diamine, when left in solution during subsequent steps, can deleteriously affect the quality of the resulting product and can lead to environmental problems. Without being bound to a particular theory, it is believed that unreacted diamine can react with the aromatic dianhydride to form polyimide blocks, which are insoluble in the copolymer matrix.

The unreacted organic diamine from the first reaction step is, therefore, separated from the oligomer-solvent mixture prior to reaction with the dianhydride. The organic diamine may be separated by any convenient physical or chemical procedure. For example, the oligomer-solvent mixture may be combined with a miscible non-solvent, such as methanol, ethanol, acetonitrile, or the like to cause precipitation of the oligomer. Methanol is a preferred material for this process. The non-solvent is added in an amount to cause substantially quantitative precipitation of the oligomer. Following precipitation, the oligomer is recovered, e.g. by centrifugation or filtration and re-dissolved in an inert, non-polar solvent for further polymerization.

Alternatively, the unreacted diamine can be removed from the oligomer-solvent mixture by aqueous extraction. If the particular organic diamine employed is sufficiently soluble in water, then extraction with water may be employed. For example, m-phenylenediamine is quite water-soluble. Greater proportions of the diamine may be extracted from the oligomer-solvent mixture using multiple reactions with water.

Advantageously, the unreacted diamine is extracted with an acidic aqueous solution. Suitable acids include soluble organic acids, such as benzoic acid, citric acid, phthalic acid, oxalic acid, p-toluenesulfonic acid, pyromellitic acid and the like. The aqueous acidic solution has a pH ranging from about 1 to about 5, preferably from about 2 to about 3.

A preferred aqueous acidic solution contains pyromellitic acid. This acid is preferred because it is a relatively strong acid and has high water solubility. Moreover, when the organic dianhydride is pyromellitic dianhydride, residual amounts of pyromellitic acid may be incorporated into the copolymer. When aqueous pyromellitic acid is used, the concentration of the pyromellitic acid in water generally ranges from about 1% w/v to about 5% w/v, preferably from about 2% w/v to about 3% w/v. Irrespective of the concentration of acid, the amount of acid should be somewhat above stoichiometric. In the case of pyromellitic acid, an amount ranging from about 0.55 to about 2 moles of acid per mole of organic diamine is used.

The extraction may be carried out by techniques known in the art. In general, each part by volume of the oligomer-solvent mixture is combined with about 0.5 to 2 parts of the aqueous solution and the solution vigorously mixed. After phase separation, the aqueous solution is removed. Further extraction can be used if necessary, but substantially quantitative (e.g., greater than about 90%) removal of unreacted diamine can usually be achieved with a single extraction with an acidic aqueous solution.

After the two phases have been separated, the non-polar organic phase containing the diamine-free oligomer may be heated at a temperature of from about 100° C. to 120° C. to remove any residual water and some of the non-polar solvent to slightly concentrate the oligomer. It is important to remove substantially all of the residual water, i.e., greater than about 95%, before reacting the oligomer with a second organic dianhydride, inasmuch as residual water can hydrolyze the dianhydride.

An organic anhydride is added to the diamine-free oligomer solution incorporating it into the oligomer to increase the Tg and eliminate the brittle nature of the final polyetherimide copolymer. The organic dianhydrides employed have the following formula: VI.

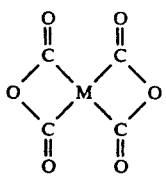

where M comprises:

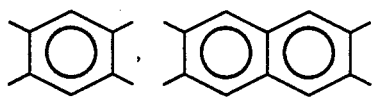

or

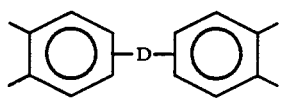

where D is —S—,

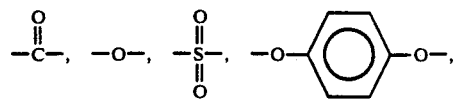

or

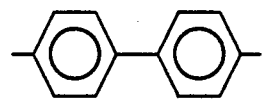

Examples of these organic dianydrides include but are not limited to pyromellitic dianhydride, benzophenone dianhydride, biphenyl dianhydride, hydroquinone dianhydride, sulfur dianhydride and the like. The preferred organic dianhydride is pyromellitic dianhydride. The organic dianhydride is added to the reaction mixture containing the oligomer in solid or preferably in solution form. If the organic dianhydride is added to the reaction mixture in solution form, the solvent employed preferably is the same solvent used in the oligomer-mixture, i.e., non-polar solvent. Optionally, the solution of organic dianhydride and non-polar solvent can be heated to partially dissolve the organic dianhydride. Monofunctional organic amines, such as aniline, or organic anhydrides, such as phthalic anhydride or maleic anhydride can be added to provide molecular weight control. These so-called chainstoppers are typically added in amounts ranging from about 0.1 to 10 mole percent of the total moles of reactants employed in preparing the oligomer. Typically, the solution is heated at a temperature of about 150° C. to about 200° C. for about 10 to about 30 minutes. Generally, a sufficient amount of organic anhydride is added to the solvent to make about a 5% to about 15% (w/v) preparation. Once the organic anhydride is sufficiently solubilized in the solvent as can be determined by the person of ordinary skill in the art, a sufficient amount of this preparation is added to the oligomer-solution mixture, or alternatively the oligomer-solution mixture can be added to the solubilized organic anhydride, and the composition is then heated to a temperature of from about 150° C. to about 250° C. for about 1 to about 4 hours depending upon the specific reactants employed. The amount of organic anhydride incorporated into the oligomer ranges from about 18 to about 50 molar % of the entire polyetherimide. This results in polyetherimides having a Tg of about 18° to about 46° C. higher than a polyetherimide prepared by a different process. The Tg's of the polyetherimide-polyimide copolymers made by the process of the present invention range from about 234° C. to about 262° C. where the polyetherimide comprises about 50 molar parts of pyromellitic dianhydride.

The reaction mixture comprising the oligomer and the additional organic anhydride is devolatilized. The devolatilization process fully polymerizes the oligomer forming a molten polyetherimide, and also removes the solvent. Any suitable method for devolatilizing an oligomer as practiced in the art can be employed such as a Haake Rheocord, devolatilizing filmstruders or devolatilizing extruders. Devolatilization occurs at temperatures ranging from about 315° C. to about 360° C. for a period of from about 0.5 to 2 hours.

The resulting novel polyetherimide resulting from this novel process comprises structural units of the empiracal formula:

$$(A)_m(B)_{1-m} \quad \text{VII.}$$

where the mole fraction m stands for a number greater than 0.5 and smaller than 1, preferably a number in the range of from about 0.50 to about 0.82, preferably from about 0.55 to about 0.82.

The A units are represented by the general formula:

VIII.

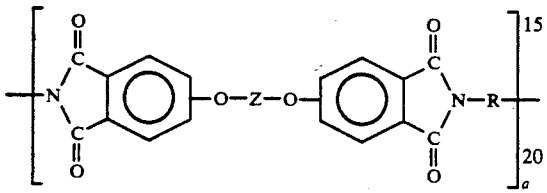

where —O—Z—O— can be in the 3' or 3- and 4 or 4'-positions and Z is as defined above, and the B units are represented by the general formula:

IX.

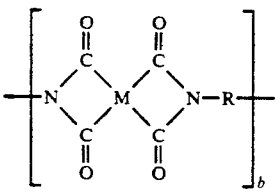

where R is a divalent organic radical as previously defined, M is as previousy defined and b advantageously ranges from about 0.1 to about 0.5, preferably from 0.18 to about 0.45.

This invention is further illustrated by the follwing examples. However, these examples are not intended to limit the scope and content of this invention.

EXAMPLE I

A mixture of 50.0 grams (0.096 moles) of 2,2-bis(4-(2,3-dicarboxyphenoxy)phenyl) propane dianhydride, also known as bisphenol-A dianhydride, was added to a reaction vessel containing 100 mls of o-dichlorobenzene with warming until the bisphenol-A dianhydride dissolved. Then 20.8 grams (0.192 moles) of m-phenylenediamine was added to the reaction vessel and the mixture was heated to about 180° C. with distillative removal of the water of reaction. (The water of reaction was trapped in a Dean Stark trap.) The reaction was carried out until about 3.4 mls of water had been collected to assure that the oligomer-forming reaction was essentially complete. At this point, about 87% of the m-phenylenediamine had reacted with the bisphenol-A dianhydride to form an amine-terminated oligomer. About 13% of the m-phenylenediamine remained unreacted. The resulting oligomer-solvent mixture was allowed to cool to about 100° C.

An aqueous solution of pyromellitic acid was prepared by dissolving 3.5 grams (0.014 moles) of pyromellitic acid in 125 mls of water making a 2.8% (w/v) solution. The aqueous solution of pyromellitic acid was then mixed and vigorously stirred with the oligomer-solvent mixture for about 15 minutes to extract the unreacted m-phenylenediamine. The reaction vessel containing the two solutions was allowed to stand for 30 minutes to allow for optimal separation of the aqueous phase (top) containing the pyromellitic acid and unreacted m-phenylenediamine from the o-dichlorobenzene phase (lower) containing the oligomer. About 95% of the unreacted m-phenylenediamine was removed from the oligomer-solvent mixture. The o-dichlorobenzene phase was removed from the first reaction vessel and placed into a second reaction vessel and heated to about 100° C. in a vacuum (about 50 mm of Hg) to remove the remaining residual water of reaction and some of the o-dichlorobenzene (about 5 mls) to concentrate the oligomer. At this point, 1.73 grams (0.012 moles) of phthalic anhydride was added to the second reaction vessel to act as a chainstopper for the oligomer. This mixture was heated to about 150° C. for about 15 minutes.

A solution of pyromellitic dianhydride in o-dichlorobenzene was prepared by adding 14.2 grams (0.065 moles) of pyromellitic dianhydride to 120 mls of o-dichlorobenzene with heating at a temperature of about 180° C. to partially dissolve the pyromellitic dianhydride. This preparation was then added to the second reaction vessel containing the oligomer and the mixture was heated at 180° C. for two hours. The reaction mixture was then devolatilized in a Haake Rheocord heating at 340° C. for about one hour. This reaction, which, in addition to removing solvent, fully polymerizes the oligomer. The resulting polyetherimide-polyimide copolymer was clear and flexible after passing it through a film extruder. The glass transition temperature (Tg) was determined to be 249° C.

EXAMPLE II

A polyetherimide-polyimide copolymer was prepared according to the method in Example I except that the m-phenylenediamine was not extracted with water nor an aqueous solution containing pyromellitic acid. The physical properties of the resulting polyetherimide were far inferior to those of the polyetherimide obtained in Example I.

A mixture of 50.0 grams of bisphenol-A dianhydride in 100 mls of o-dichlorobenzene was heated until the bisphenol-A dianhydride dissolved. Then 20.8 grams of m-phenylenediamine was added to the bisphenol-A dianhydride solution heating the mixture at a temperature of about 180° C. with distillative removal of water. The resulting oligomer-solvent mixture was allowed to cool to a temperature of about 100° C. After the mixture had cooled, 125 mls of distilled water was vigorously mixed for about 15 minutes with the oligomer-solvent mixture to extract the unreacted m-phenylenediamine. The resulting mixture was then allowed to seperate for about 30 minutes into an aqueous phase (top) and an o-dichlorobenzene phase (lower) comprising the oligomer. It was discovered that only 50% of the unreacted m-phenylenediamine was extracted from the o-dichlorobenzene phase into the aqueous phase.

The o-dichlorobenzene phase containing the oligomer and 50% of the unreacted m-phenylenediamine was then heated at about 100° C. under a vacuum (about 50 mm of Hg) to remove residual water and some of the o-dichlorobenzene to concentrate the oligomer. Then 1.73 grams of phthalic anhydride was added to the o-dichlorobenzene phase to act as a chainstopper and the mixture was heated to about 150° C. for about 15 minutes. At this point, a solution containing 14.2 grams of pyromellitic dianhydride in 120 mls of o-dichlorobenzene was added to the reaction vessel containing the oligomer, and the mixture was heated at about 180° C. for about 2 hours. The resulting composition was then devolatilized in a Haake Rheocord at about 340° C. for 1 hour.

Although the properties of this product had improved properties over those prepared without an organic diamine extraction step, the resulting polyetherimide was still brittle and opaque with large amounts of insolubles (non-melting specks). This product was inferior compared to the polyetherimide obtained in Example I.

EXAMPLE III

An amine-rich oligomer was prepared according to the method of the present invention in order to determine the efficiency of this method for removing unreacted organic diamine from the oligomer-solvent mixture.

A mixture of 121.4 grams of 2,2-bis(4-(2,3-dicarboxyphenoxy)phenyl)propane dianhydride, hereinafter referred to as bisphenol-A dianhydride, and 113.0 mls of o-dichlorobenzene was heated in a 500 ml round bottom flask and stirred using a mechanical stirrer until the bisphenol-A dianhydride was dissolved. The mixture was allowed to cool to a temperature of about 100° C. and then 32.4 grams of m-phenylenediamine was added to the bisphenol-A dianhydride solution. This mixture then was heated to a temperature of about 180° C. for a period of two hours with distillative removal of the water of reaction. (The water of reaction was caught in a Dean Stark trap.) The process was performed in a nitrogen environment, i.e., nitrogen atmosphere.

A 1.3 gram sample of the resulting oligomer was employed to determine the amount of unreacted or free m-phenylenediamine prior to extracting the free m-phenylenediamine with an aqueous solution of pyromellitic acid. The amount of free m-phenylenediamine was determined by gas chromatography to be 0.24% by weight of the test sample.

An oligomer was prepared according to the method described above. Five seperate oligomer samples of 11.4 grams each were washed with about 6 mls of an aqueous solution of pyromellitic acid to remove the free m-phenylenediamine. The pyromellitic acid solution was prepared by dissolving 2.0 grams of pyromellitic dianhydride in 100 mls of deionized water to prepare a stock solution. Five 1.9 ml samples of the stock solution were mixed with five seperate samples of 3.8 mls of deionized water to be used as washes for the five oligomer samples. Each oligomer sample was washed with the pyromellitic acid solution for different time periods. All the samples were heated with an oil bath at a temperature of about 105° C. during their washing period with the exception of the sample that was washed over night.

After the washing was completed, 2.1 grams of the oligomer were removed from each of the five samples and tested to determine the amount of unreacted m-phenylenediamine remaining after the washing. These results show a significant decrease in the amount of unreacted m-phenylenediamine in the washed oligomer samples as compared to the untreated oligomer sample.

I claim:

1. A process for preparing a polyetherimide-polyimide copolymer, which comprises:
   (a) reacting an aromatic bis(ether anhydride) of the formula:

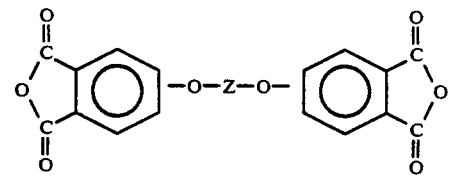

with a stoichiometric excess of an organic diamine of the general formula:

in an inert, non-polar solvent to form an amine-terminated oligomer-solvent mixture, wherein Z is a divalent organic group of the general formula:

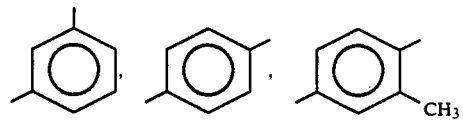

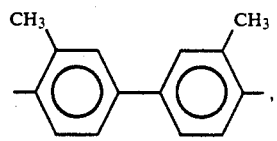

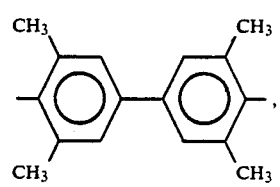

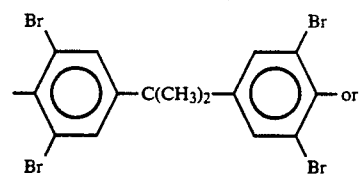

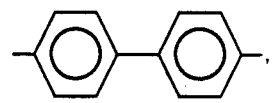

or a divalent organic group of the general formula:

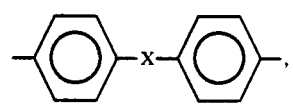

wherein X is

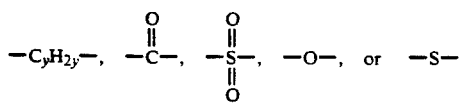

where y is an integer from 1 to about 5, and R is a divalent aromatic hydrocarbon group having from 6 to 20 carbon atoms and halogenated derivatives thereof, alkylene radicals having from 2 to about 20 carbon atoms, from $C_2$ to about $C_8$ alkylene terminated polydiorganosiloxanes, and divalent radicals comprising the formula

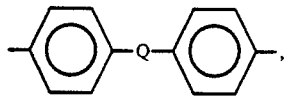

where Q is a member comprising

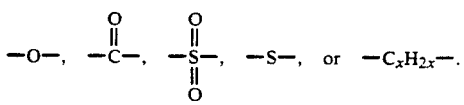

and x is an integer from 1 to about 5;

(b) removing unreacted organic diamine from the oligomer-solvent mixture;

(c) reacting the oligomer with an aromatic dianhydride of the formula:

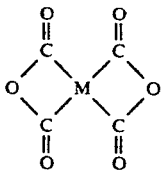

under polyimide-forming conditions, wherein M is

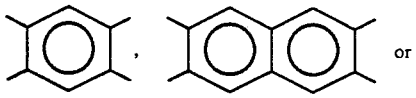

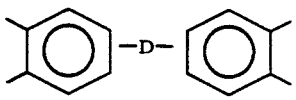

where D is $-S-$, $-\overset{O}{\underset{}{C}}-$, $-\overset{O}{\underset{O}{S}}-$, or

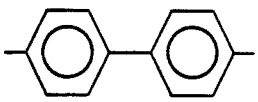

2. The process of claim 1, wherein the bis (ether anhydride) is of the formula

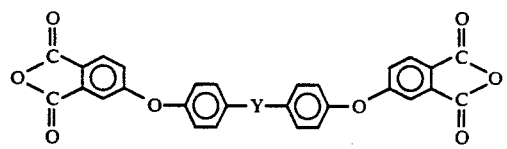

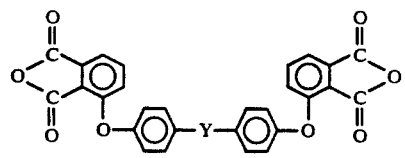

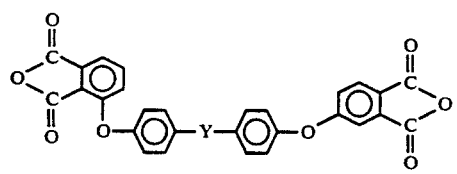

or a mixture thereof, where Y is O, S,

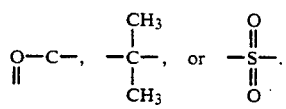

3. The process of claim 2, wherein the bis (ether anhydride) is of the formula

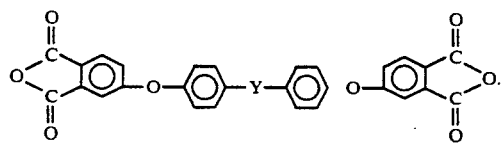

4. The process of claim 1, wherein the inert, non-polar solvent is selected from the group consisting of anisole, veratrole, biphenyl, terphenyl, diphenylether, diphenyl sulfide, chlorinated biphenyl, chlorinated diphenylethers.

5. The process of claim 4, wherein the bis (ether anhydride) and the organic diamine are reacted at a temperature of from about 100° C. to about 200° C.

6. The process of claim 5, wherein from about 1.1 to about 5 moles of organic diamine per mole of bis (ether anhydride) are employed.

7. The process of claim 6, wherein the bis (ether anhydride) and the organic diamine are reacted at a temperature of from about 160° C. to about 180° C. and from about 1.3 to about 3 moles of organic diamine per mole of bis (ether anhydride) are employed.

8. The process of claim 7, wherein the unreacted organic diamine is removed by adding a miscible non-solvent to the oligomer-solvent mixture in an amount sufficient to cause precipitation of the organic diamine.

9. The process of claim 7, wherein the unreacted organic diamine is removed by extraction with an acidic aqueous solution.

10. The process of claim 9, wherein the unreacted organic diamine is extracted with an aqueous solution of an organic acid selected from the group consisting of benzoic acid, citric acid, phthalic acid, oxalic acid, p-toluenesulfonic acid and pyromellitic acid, wherein the pH of the aqueous solution ranges from about 1 to about 5.

11. The process of claim 10, wherein the organic acid is pyromellitic acid, the pH of the aqueous solution is from about 2 to about 3 and from about 0.5 to about 2 moles of acid per mole of organic diamine are employed.

12. The process of claim 6, wherein the reaction between the oligomer and the organic dianhydride occurs at a temperature of from about 100° C. to about 250° C. for a period of about 1 to about 4 hours.

13. The process of claim 6, wherein the organic dianhydride is pyromellitic dianhydride, benzophenone dianhydride, or sulfur dianhydride.

14. The process of claim 13, wherein the organic dianhydride is pyromellitic dianhydride.

15. The process of claim 6, wherein the bis(ether anhydride) is 2,2-bis(4-(3,4-dicarboxyphenoxy)-phenyl)-propane dianhydride.

16. The process of claim 15, wherein the organic diamine is m-phenylenediamine.

17. A polyetherimide prepared by the process of claim 1.

18. A process for preparing a polyetherimide-polyimide copolymer, said process comprising:
   (a) reacting an aromatic bis(ether anhydride) with a stoichiometric excess of an organic diamine in an inert, non-polar solvent to form an amine-terminated oligomer-solvent mixture,
   (b) removing unreacted organic diamine from the oligomer-solvent mixture; and
   (c) reacting the oligomer with pyromellitic dianhydride.

19. The process of claim 1, wherein said process consists essentially of said (a), (b) and (c).

20. The process of claim 18, wherein said process consists essentially of said (a), (b) and (c).

* * * * *